(12) United States Patent
Vasseur et al.

(10) Patent No.: US 9,654,361 B2
(45) Date of Patent: May 16, 2017

(54) DYNAMIC COLLECTION OF NETWORK METRICS FOR PREDICTIVE ANALYTICS

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 14/276,563

(22) Filed: May 13, 2014

(65) Prior Publication Data

US 2015/0333992 A1 Nov. 19, 2015

(51) Int. Cl.
*H04L 12/26* (2006.01)
*H04L 12/46* (2006.01)
*H04L 29/06* (2006.01)
*H04L 12/24* (2006.01)

(52) U.S. Cl.
CPC ........ *H04L 43/062* (2013.01); *H04L 12/4633* (2013.01); *H04L 12/4641* (2013.01); *H04L 43/02* (2013.01); *H04L 43/04* (2013.01); *H04L 43/0876* (2013.01); *H04L 63/1408* (2013.01); *H04L 41/142* (2013.01); *H04L 41/147* (2013.01); *H04L 41/16* (2013.01); *H04L 41/5009* (2013.01); *H04L 43/026* (2013.01); *H04L 43/028* (2013.01); *H04L 43/087* (2013.01); *H04L 43/0817* (2013.01); *H04L 43/0829* (2013.01); *H04L 43/0882* (2013.01); *H04L 43/16* (2013.01)

(58) Field of Classification Search
CPC ........... H04L 2463/141; H04L 63/1416; H04L 63/1425; H04L 63/1458; H04L 2463/144; H04L 63/14; H04L 63/1441

USPC .......................................................... 370/252
See application file for complete search history.

(56) References Cited

U.S. PATENT DOCUMENTS

| 6,470,025 B1* | 10/2002 | Wilson | H04L 12/4641 370/235 |
| 7,120,689 B2* | 10/2006 | Gonsalves | H04L 43/026 709/223 |
| 7,941,529 B2 | 5/2011 | Claise et al. | |
| 8,510,821 B1* | 8/2013 | Brandwine | H04L 63/1416 709/229 |

(Continued)

FOREIGN PATENT DOCUMENTS

| EP | 2728828 A1 | 5/2014 |
| WO | WO-02080417 A1 | 10/2002 |

OTHER PUBLICATIONS

Sajassi, et al., "BGP MPLS Based Ethernet VPN", Network Working Group, Internet Draft, draft-ietf-l2vpn-evpn-07, May 2014, 50 pages, The Internet Engineering Task Force Trust.

*Primary Examiner* — Khaled Kassim
*Assistant Examiner* — Berhanu Belete
(74) *Attorney, Agent, or Firm* — Parker Ibrahim & Berg LLC; James M. Behmke; Kenneth J. Heywood

(57) ABSTRACT

In one embodiment, data is received at a device regarding a network-monitoring process in which one or more nodes in a network export network metrics to one or more collector nodes. A change to the network-monitoring process is determined based on the received data. The device also adjusts the network-monitoring process to implement the determined change.

19 Claims, 13 Drawing Sheets

(56) References Cited

U.S. PATENT DOCUMENTS

| | | | |
|---|---|---|---|
| 8,654,765 B2 | 2/2014 | Singh et al. | |
| 2006/0182034 A1* | 8/2006 | Klinker | H04L 12/2602 370/238 |
| 2008/0271025 A1* | 10/2008 | Gross | G06F 11/3051 718/102 |
| 2009/0106174 A1* | 4/2009 | Battisha | H04L 12/2602 706/12 |
| 2010/0281539 A1* | 11/2010 | Burns | H04L 63/1441 726/23 |
| 2011/0106942 A1* | 5/2011 | Roskowski | H04W 24/00 709/224 |
| 2011/0131650 A1* | 6/2011 | de los Reyes | H04L 63/0209 726/22 |
| 2011/0145920 A1* | 6/2011 | Mahaffey | G06F 21/564 726/22 |
| 2012/0155475 A1* | 6/2012 | Vasseur | H04L 45/028 370/400 |
| 2012/0174220 A1* | 7/2012 | Rodriguez | H04L 63/1416 726/23 |
| 2012/0230232 A1* | 9/2012 | Ji | H04B 7/2656 370/280 |
| 2012/0231824 A1* | 9/2012 | Budic | H04L 47/125 455/507 |
| 2012/0287681 A1* | 11/2012 | Wahledow | H02M 1/38 363/21.04 |
| 2013/0028104 A1* | 1/2013 | Hui | H04L 45/48 370/252 |
| 2013/0262703 A1 | 10/2013 | Dong et al. | |
| 2013/0305357 A1* | 11/2013 | Ayyagari | H04L 63/14 726/22 |
| 2014/0059200 A1* | 2/2014 | Nguyen | H04L 43/026 709/224 |
| 2014/0094159 A1* | 4/2014 | Raleigh | H04W 24/02 455/418 |
| 2014/0098671 A1* | 4/2014 | Raleigh | H04M 15/80 370/235 |
| 2014/0269292 A1* | 9/2014 | Kalkunte | H04L 45/123 370/232 |
| 2015/0019686 A1* | 1/2015 | Backholm | H04L 47/32 709/217 |

* cited by examiner

DYNAMIC COLLECTION OF NETWORK METRICS FOR PREDICTIVE ANALYTICS

TECHNICAL FIELD

The present disclosure relates generally to computer networks, and, more particularly, to dynamically collecting network metrics for predictive analytics.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. However, such a reactive approach may also, by its very nature, mean that the network experiences periods of reduced performance before corrective measures are taken.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, data is received at a device regarding a network-monitoring process in which one or more nodes in a network export network metrics to one or more collector nodes. A change to the network-monitoring process is determined based on the received data. The device also adjusts the network-monitoring process to implement the determined change.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
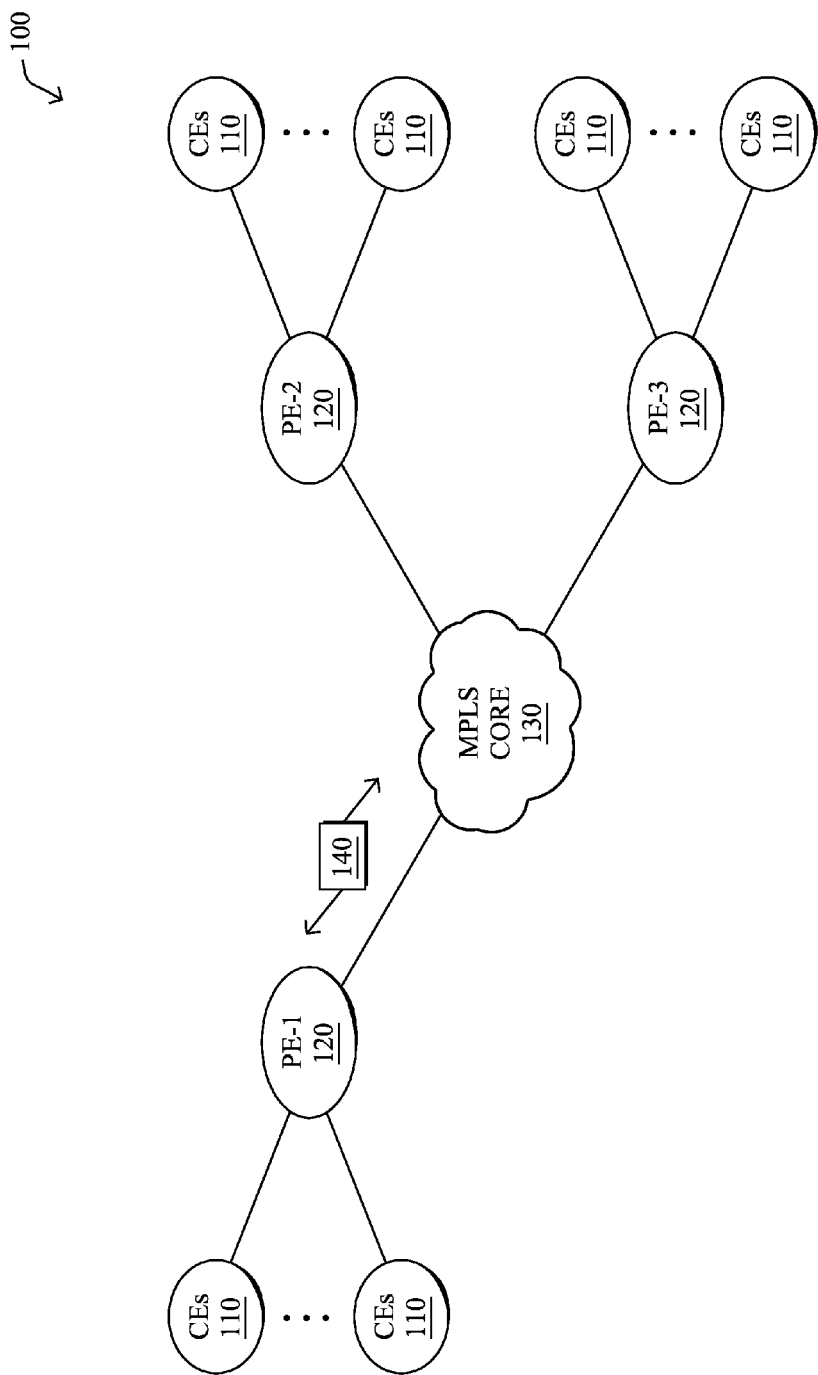
FIG. 1 illustrates an example communication network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

4.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Figure 2:
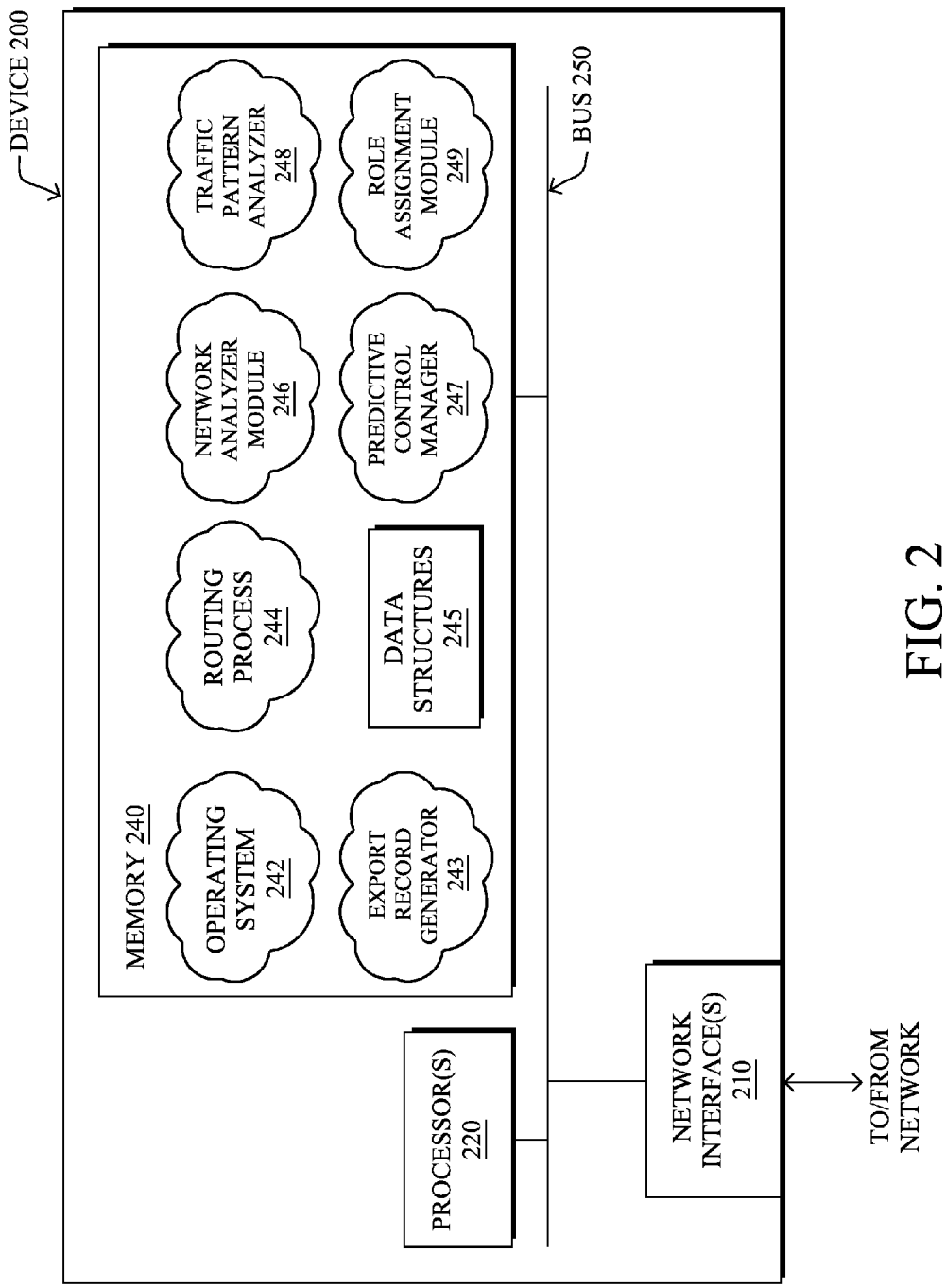
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CEs 110, a network controller (e.g., a device associated with a network operations center (NOC)), or any other computing device that supports the operations of network 100 (e.g., switches, etc.).

Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may comprise routing process 244 (e.g., routing services) and illustratively, an export record generator 243, a network analyzer module (NAM) 246, a predictive control manager (PCM) 247, a traffic pattern analyzer (TPA) 248, and/or a role assignment module 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instances, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduces a solution for multipoint L2VPN services, with advanced multi-homing capabilities, using BGP for distributing customer/client media access control (MAC) address reach-ability information over the core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performances in terms of connectivity and bandwidth.

According to various embodiments described herein, a dynamic, predictive performance architecture is disclosed that may be implemented in a network, such as a multi-service, multi-carrier WAN. In particular, export record generator 243, NAM 246, PCM 247, TPA 248, and/or role assignment module 249 may operate in conjunction to perform predictive networking, in contrast with existing approaches that rely on reactive networking techniques. In some aspects, TPA 248 may be responsible for tracking all possible attributes of the traffic that is flowing through a router or other device, in order to make predictions regarding the traffic. For example, these attributes may be used to characterize traffic flows over the course of time and to generate profiles that can be used for prediction. In another aspect, NAM 246 may be used to generate an analytical model of the attributes of the network (potentially as a function of time), in order to predict network performance. In a further aspect, PCM 247 may gather application-specific SLAs (e.g., from the ACI controller/dAPIC of routing services 244) and correlate the application-specific SLAs with the predicted traffic profile and network performance, to perform closed-loop control that meets the application-specific SLAs. In some aspects, role assignment module 249 may support the predictive analytics of NAM 246, PCM 247, and/or TPA 248 by dynamically adjusting which nodes export or collect metrics regarding the operational state of the network and used to make predictions regarding the network. Similarly, export record generator 243 may be operable to dynamically adjust which information is collected and exported by a given node.

In various implementations, processes 243-244 and 246-249 may be co-located or may be distributed across different network devices. Further, while certain functions are described herein with respect to a particular one of processes 243-244 and 246-249, the functions may be incorporated into any of the other processes, in various other embodiments.

Figure 3:
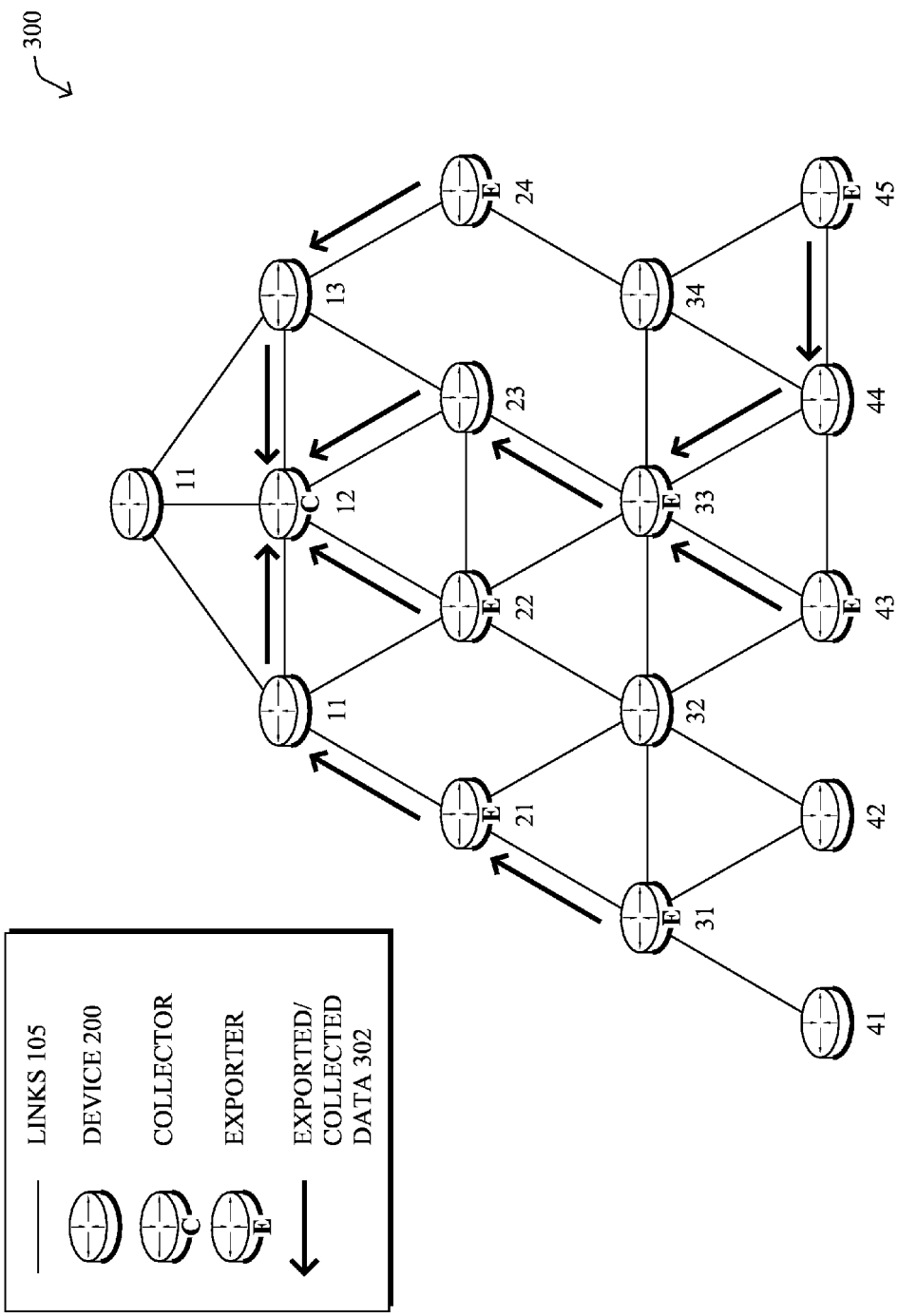
FIG. 3 illustrates an example of a network-monitoring process.

Referring now to FIG. 3, a network segment 300 is shown in which traffic and/or network-related metrics are exported and collected by various nodes, as part of a network monitoring process, according to various embodiments. In some implementations, network segment 300 may be part of a larger network, such as network 100 illustrated in FIG. 1. As shown, assume that certain devices/nodes in network segment 300 are selected to be exporters (denoted "E" in FIG. 3). In general, an exporter node may monitor and report on metrics regarding the operating state of the node, traffic flowing through the node, and/or metrics regarding the state of the network. For example, exporter node 43 may track and export data 302 that contains metrics regarding its central processing unit (CPU) load, memory usage, line-card loads, queue lengths, transmission rates, routed traffic, traffic loads, path lengths traversed, bandwidth throughputs, combinations thereof, or any other metrics that may be used to assess the operational state of the node or of the network itself. As used herein, an "export record" refers to the set of specific metrics that a given exporter node is to monitor and report.

Also as shown in FIG. 3, one or more nodes may be designated as a collector node. Generally speaking, a collector node is operable to receive and aggregate data 302 from the exporter nodes. For example, node 12 may collect and aggregate data 302 received from exporter nodes 21, 22, 24, 31, 33, 43, and 45. Aggregation may entail, for example, generating statistics regarding the reported metrics in data 302, performing calculations on metrics in data 302 regarding overlapping devices or portions of the network, sampling the metrics in data 302, otherwise generalizing the metrics in data 302, or the like. In other cases, a collector node may simply operate as a repository for the metrics included in data 302. As used herein, the term "export/collection process" refers generically to a network-monitoring process in which data regarding the operating conditions of the network are exported and collected by various nodes in the network, such as that shown in the example of FIG. 3.

In one embodiment, a collector node may use the aggregated data to make predictions regarding a particular node and/or a particular network link or path (e.g., the aggregated data may be used by the collector node as part of a predictive networking strategy). For example, collector node 12 may use the received data 302 to make predictions regarding network segment 300 and use the predictions to adjust the operation of one or more devices in network segment 300. In another embodiment, a collector node may provide the aggregated data to another device, such as another router, a network controller, or the like, that performs the predictive networking.

According to various embodiments, a predictive performance methodology for WANs and other forms of networks is introduced that that allows for the methodology to be used across varying network architectures, application requirements, and deployment strategies, as well as in the presence of dynamic traffic and network performances. As detailed below, such an architecture may make use of machine learning techniques, in some embodiments, to evaluate future network requirements and performance, and to take corrective measures within the network to ensure the SLAs are met.

Figure 4A:
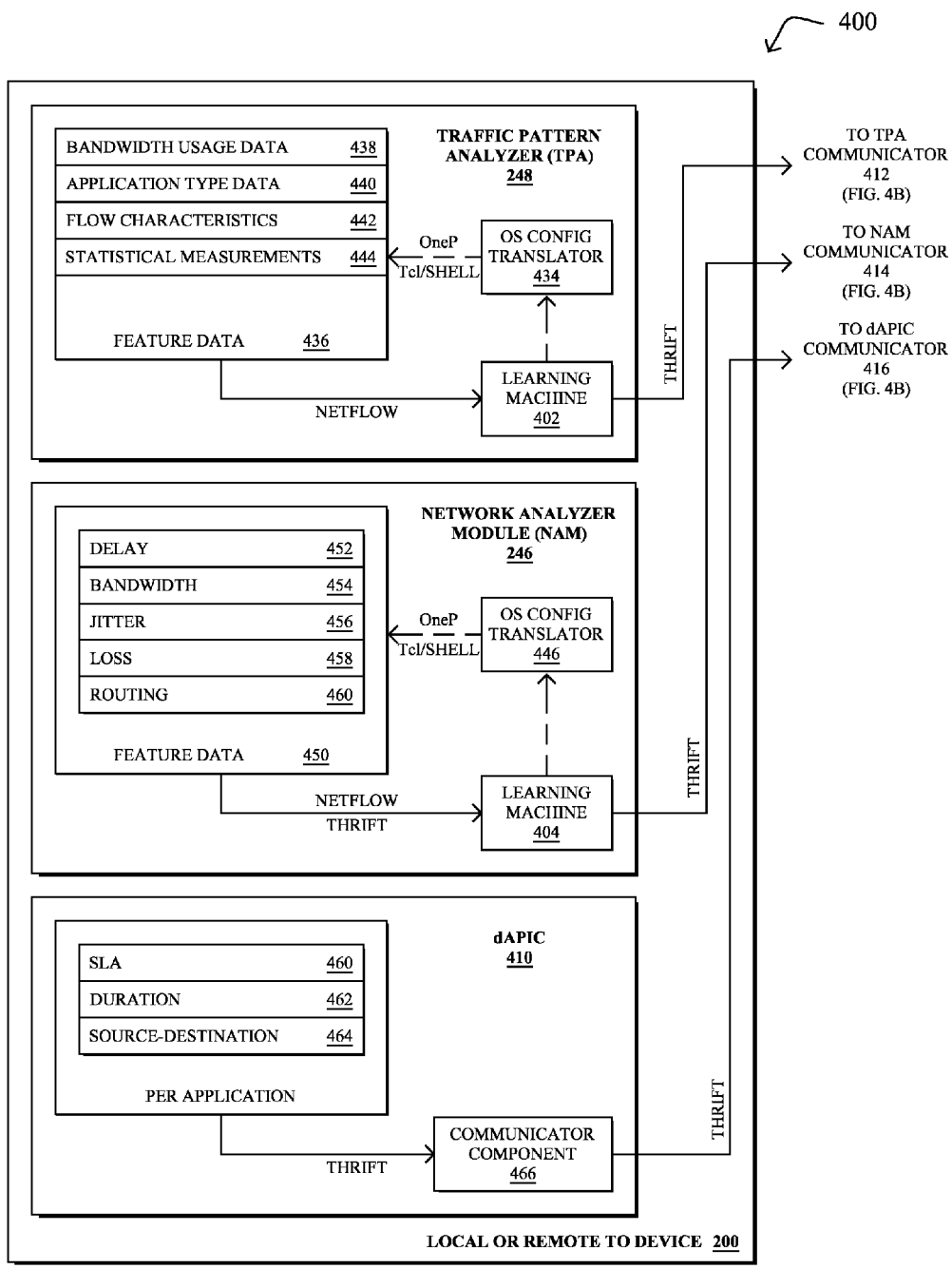
FIGS. 4A-4B illustrate an example architecture for predictive networking.
Figure 4B:
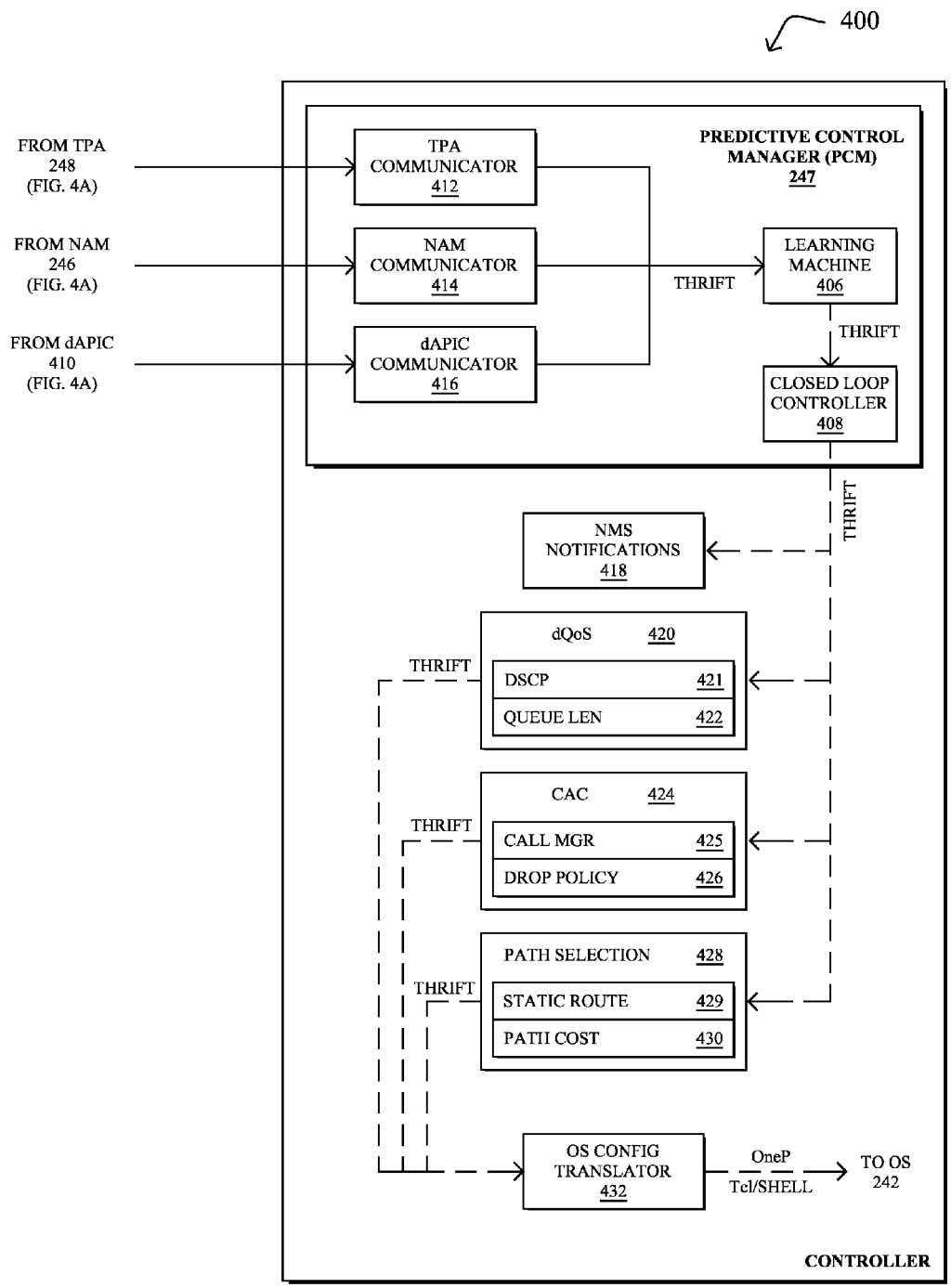

Referring now to FIGS. 4A and 4B, an example architecture 400 for predictive networking is shown in greater detail, according to various embodiments. As shown in FIG. 4A, TPA 248, NAM 246, and/or a dAPIC 410 may be local or remote to a given device 200. In FIG. 4B, PCM 247 may be hosted on a different device, such as a network controller, or may be integrated into the same device as that illustrated in FIG. 4A, in various embodiments.

Underlying the functionality of NAM 246, PCM 247, and/or TPA 248 may be learning machines 404, 406, and 402, respectively. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Learning machines (e.g., learning machines 402-406) are computational entities that rely on one or more machine learning processes for performing a task for which they have not been explicitly programmed to perform. In particular, learning machines are capable of adjusting their behavior to their environment. For example, a learning machine may dynamically make future predictions based on current or prior network measurements, may make control decisions based on the effects of prior control commands, etc.

Learning machines 402-406 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Other forms of machine learning techniques that may be employed by learning machines 402-406 may include, but are not limited to, support vector machines (SVMs), Bayesian networks, regression techniques (e.g., logistic regression, linear regression, non-linear regression, etc.), combinations thereof, or any other form of machine learning.

In various embodiments, TPA 248 may reside within a router or on a host computing device, and may have connectivity to one or multiple routers in the network. In general, TPA 248 may be operable to analyze every facet of the traffic flowing through the router. For example, TPA 248 may receive traffic-related data from the operating system of the device via an OS configuration translator 434, such as from an application visibility and control (AVC) process that is configured to classify traffic data according to application type (e.g., Cisco AVC® of Cisco Systems, Inc.), a network traffic flow process (e.g., Cisco IOS Flexible Netflow® of Cisco Systems, Inc.), a media metrics process (e.g., a process that generates metrics regarding video streams), etc. These or other such reporting technologies may be used by TPA 248 to compute a set of input feature data 436 (e.g., attributes that capture the characteristics of the traffic), that may be used by learning machine 402 to predict a traffic profile.

Feature data 436 may include any or all of the following information:

1.) Bandwidth Usage Data 438: In some cases, feature data 436 may include data regarding the bandwidth usage of a particular type of traffic (e.g., application-specific bandwidth usage information). This information may provide a profile of the traffic over the course of time to learning machine 402.

2.) Application Type Data 440: Feature data 436 may include data regarding the various application types associated with the traffic (e.g., VoIP, video, etc.). In various embodiments, application types may be determined based on the port numbers used, via an application recognition utility (e.g., Network Based Application Recognition® of Cisco Systems, Inc.), or the like.

3.) Flow Characteristics 442: In some cases, feature data 436 may include traffic flow information such as the duration of a flow, the rate of new flows, metrics capturing the rate of change of the previous metrics over time, or other such information. These flow characteristics may be captured from underlying infrastructures such as an application recognition utility, a call manager, or the like.

4.) Statistical Measurements 444: In some embodiments, feature data 436 may include statistical measurements regarding the flow of traffic. For example, measurements 444 may include data regarding the moments (e.g., variance, skewness, kurtosis, etc.) of the traffic distribution, both in terms of packets/sec and bytes/sec, on a per flow basis, or on a per time path basis. In another example, measurements 444 may include other statistical properties of the traffic flow, such as autocorrelation, Fourier series coefficients, etc.

Together, feature data 436 can be used by learning machine 402 to determine characteristics of the underlying traffic flow and how it changes with time. Once learning machine 402 starts to develop a time series model using these attributes, for example, it may decide that it needs more information about some of these features or, conversely, that some of these features are not relevant. In such cases, the update rate of the features may be adjusted accordingly by TPA 248 (e.g., to reduce the update rate of irrelevant data, etc.). In one embodiment, adjusting the refresh rate of feature data 436 may be policy-based to reduce traffic overhead in the network. For example, certain features may be collected or refreshed at different rates depending on the time of day, to reduce adverse effects on the network from the collection.

In some implementations, TPA 248 may require some processing capabilities that are not available on the router carrying the actual traffic itself. In such cases, TPA 248 may be hosted on a different router/host, which may be co-located either on a router blade (e.g., a UCS blade), or a different router/host connected to the router via a high bandwidth link.

According to various embodiments, NAM 246 may reside on the router processing the traffic under analysis itself or on a host that has network connectivity to the concerned routers. In general, NAM 246 may be operable to track all the network conditions that are visible to the corresponding router, in order to model the network performance characteristics. In contrast with reactive approaches, NAM 246 may be used to compute a model of the network performance using learning machine 404. For example, NAM 246 may determine the performance of each link/path available to connect a remote/branch office to a corporate network or headquarters.

Similar to TPA 248, NAM 246 may gather feature data 450 that is used as inputs to learning machine 404 (e.g., via OS configuration translator 446). For example, feature data 450 may be determined in part by sending probes between a given sender and a given responder, to capture metrics regarding the performance along the path. Other sources of feature data 450 may also include any or all of the sources used to determine feature data 436. In various embodiments, feature data 450 may include any or all of the following information:

1.) Delay Information 452: In some cases, feature data 450 includes delay measurements along a given network path and/or link.

2.) Bandwidth Information 454: Feature data 450 may also include bandwidth information associated with a given network path and/or link. For example, bandwidth information 454 may include data regarding the total bandwidth usage of the path or link, the per-application bandwidth usage of the path or link, available bandwidth along the path or link, etc.

3.) Jitter Information 456: Feature data 450 may further include jitter information associated with a given path and/or link. For example, the total amount or application-specific jitter measurements along a path or link may be included in feature data 450.

4.) Packet Loss Information 458: In some cases, feature data 450 may include packet loss information, such as a measured packet loss rate along a given path and/or link.

5.) Routing Information 460: Associated with any of data 452-458 may be information regarding a given network path (e.g., the link or set of links for which the measurements of data 452-458 were determined).

Learning machine 404 may continually track feature data 450 (e.g., as a time series model), to characterize these attributes. In other words, learning machine 404 may use a predictive model to predict future network performance metrics based on feature data 450. In some implementations, NAM 246 may also adjust the collection of feature data 450. For example, NAM 246 may configure one or more corresponding routers to generate more or less features based on the requirements of learning machine 404 (e.g., the amount of probing used may be adjusted as a function of the model's accuracy and confidence, based on network considerations such as current or future network usage, etc.).

In some embodiments, learning machine 404 may use the principle of data fusion to model the network performance metrics. This principle generally functions by integrating multiple data sources and knowledge about a real-world process (in this case, the underlying network), into an accurate representation of the functioning of the network. For example, bandwidth data 454 along a given path may be available from any of the following sources: (1) SLA processes may yield data about the delay, jitter and packet loss, which can, in some circumstances, be used to estimate the available bandwidth via a regression model, such as variational Bayesian least squares (VBLS) regression model, (2) actual bandwidth measurements can be taken occasionally, but with care as they affect the network performance, or (3) time-series models such as autoregressive moving average (ARMA) models, Hidden Markov Models, Gaussian Processes can be used to predict the performance evolution.

Feature data 450 available from various sources of information can be fused by NAM 246 in real time in a mathematically principled way by using a Kalman filter or graphical models, whereby the intrinsic uncertainty of each source of information is accounted for in the estimation of the data (e.g., available bandwidth, etc.). For example, if one makes a direct measurement of the actual bandwidth at time t, the uncertainty on this measure is very small, and it should therefore have a very strong impact on the estimation process at time t. However, as t increases, the uncertainty also increases as the actual bandwidth may drift away from the initial measurement. This drift may then be captured via a time-series model, and complemented by indirect measurements (e.g., based on delay, jitter, etc. measurements). As long as both sources agree, there is no reason to perform any further direct measurement, which may be very expensive, but if the prediction of the time-series model and the regression diverges, this may trigger another direct measurement. In some embodiments, NAM 246 may determine whether a direct measurement of any of feature data 450 is needed based on a measure of confidence associated with a model used by learning machine 404.

In some implementations, dAPIC 410 may store and provide various application-specific data via a communicator component 466. In general, dAPIC 410 may be operable to ensure that all the application SLAs are being met at all times in the network and, consequently, perform various actions without human intervention, to dynamically adapt the network behavior as needed. Accordingly, dAPIC 410 may have access to various application-specific SLA information such as SLA data 460 (e.g., a set of SLAs), duration data 462 regarding the SLAs (e.g., when a particular SLA is to be enforced), and/or source-destination data 464 regarding the network paths used by the various applications.

In various embodiments, TPA 248, NAM 246, and dAPIC 410 may provide data to PCM 247 shown in FIG. 4B, which may be co-located with these modules or may be hosted on another device (e.g., in a network controller, in the cloud, etc.). Accordingly, PCM 247 may include communicator modules 412, 414, and 416 to communicate with TPA 248, NAM 246, and dAPIC 410, respectively. In one embodiment, PCM 247 receives traffic model data generated by learning machine 402 from TPA 248 via communicator module 412. In a further embodiment, PCM 247 receives network performance model data generated by learning machine 404 from NAM 246 via communicator module 414. In yet another embodiment, PCM 247 may receive application-specific SLA data from dAPIC 410 (e.g., data 460-464), which may have information about all of the applications in the network, as well as their corresponding SLA requirements.

If an application SLA is predicted not to be met, PCM 247 may take any number of corrective measures to ensure that the SLAs continue to be met (e.g., by sending commands to OS 242 via an OS translator module 432). In some implementations, the corrective measures may be performed via a closed loop controller 408, thereby allowing feedback (e.g., updated predictions from TPA 248 and NAM 246) to be used by PCM 247 when taking corrective measures. In one embodiment, PCM 247 may generate and send a notification 418 to a network management system (NMS), allowing a human operator to intervene, if necessary, at the appropriate place and time in the network.

In another embodiment, PCM 247 may dynamically generate new QoS parameters 420 such that application-specific SLAs continue to be met. Example QoS parameters may include differentiated services code point (DSCP) parameters 421, queue length parameters 422, further parameters that change bandwidth percentage allocations to different classes, parameters that change the class of service for applications, etc.

In a further embodiment, PCM 247 may change call-admission control (CAC) policies 424 used as part of a communications management system. For example, CAC policies 424 may include parameters 425 for a call manager system (e.g., a system that tracks and manages active VoIP network components), drop policy parameters 426, or the like. Such parameters may be used, in some cases, to prevent admission of new traffic flows if the available bandwidth is already fully used.

In another embodiment, PCM 247 may generate path selection parameters 428. In general, path selection parameters 428 may operate to ensure that, based on a particular application type, the corresponding traffic is routed over different paths such that all applications continue to meet their SLAs. For example, path selection parameters 428 may include one or more static routes 429 to be used by a particular type of application traffic, path cost values 430 used to make routing decisions, or any other data that may be used to adjust which paths are used in the network by a particular type of application traffic. For example, traffic of class X may suddenly have to be routed over a 3G/4G link (although more costly) for a period of time T in order to meet the required SLA received from dAPIC 410 (e.g., application-specific SLAs 460), according to the predicted traffic from the TPA 248 and expected network characteristics from NAM 247.

Notably, such a predictive architecture 400 supports different modes of operation. In some cases, the system may request human intervention as part of the control loop. In other words, PCM 247 may operate as a distributed recommendation system for network parameter changes that should be adjusted in order to meet the SLAs (e.g., by sending NMS notifications 418 for review by a network engineer). In other cases, the system may be fully autonomous by employing closed loop control to make decisions on a router in real-time and report on the decisions to a human operator afterwards. As will be appreciated, the various modules described in architecture 400 may also communicate using remote procedure calls (RPCs) (e.g., using the Apache Thrift® protocol from the Apache Software Foundation or another RPC protocol), allowing the depicted modules to be co-hosted by a device or located remotely on different devices. Communications with the operating system of the device may also be performed using any suitable technique, such as by sending scripts through a Tcl/Shell.

As noted above, observed metrics from various nodes in a network may be used as part of a predictive networking strategy to make predictions regarding the future state of a device (e.g., traffic patterns through the device, available resources on the device, etc.) and/or the interconnections between devices (e.g., dropped packets, jitter, available bandwidth, etc. along a path). In some cases, a human network engineer may make configuration decisions regarding which nodes are to act as exporters or collectors of the observed metrics and the types of metrics that are exported. In such a case, subsequent configuration changes to the network-monitoring process may only be implemented after considerable analysis of the network. In addition, such a configuration approach is static in nature, potentially leading to situations in which relevant observations are missed when sudden network changes occur.

Dynamic Collection of Network Metrics

According to various embodiments, the collection of network metrics for predictive analytics may be dynamically adjusted by leveraging the predictive networking infrastructure. In one aspect, the designation of nodes as exporters or collectors of observed network metrics may be performed dynamically. Such a mechanism may take into account, for example, the overhead on the network and network devices associated with the collection of the metrics. In another aspect, the types of metrics that are exported may be dynamically adjusted, to ensure that metrics of interest are collected. For example, if the behavior of the network or a device in the network deviates from the predicted behavior by a threshold amount, the metrics that are exported by one or more nodes may be adjusted dynamically. Particularly in the context of predictive networking, such techniques may allow the reporting mechanisms of the network to be quickly adjusted when new and previously unseen network behaviors are detected.

Specifically, according to one or more embodiments of the disclosure as described in detail below, data is received at a device regarding a network-monitoring process in which one or more nodes in a network export network metrics to one or more collector nodes. A change to the network-monitoring process is determined based on the received data. The device also adjusts the network-monitoring process to implement the determined change.

Illustratively, the techniques described herein may be performed by hardware, software, and/or firmware, such as in accordance with processes 243-244, 246-249, which may contain computer executable instructions executed by the processor 220 (or independent processor of interfaces 210) to perform functions relating to the techniques described herein. For example, the techniques herein may be treated as extensions to conventional protocols, such as the various networking protocols or wireless communication protocols, and as such, may be processed by similar components understood in the art that execute those protocols, accordingly.

Figure 5:
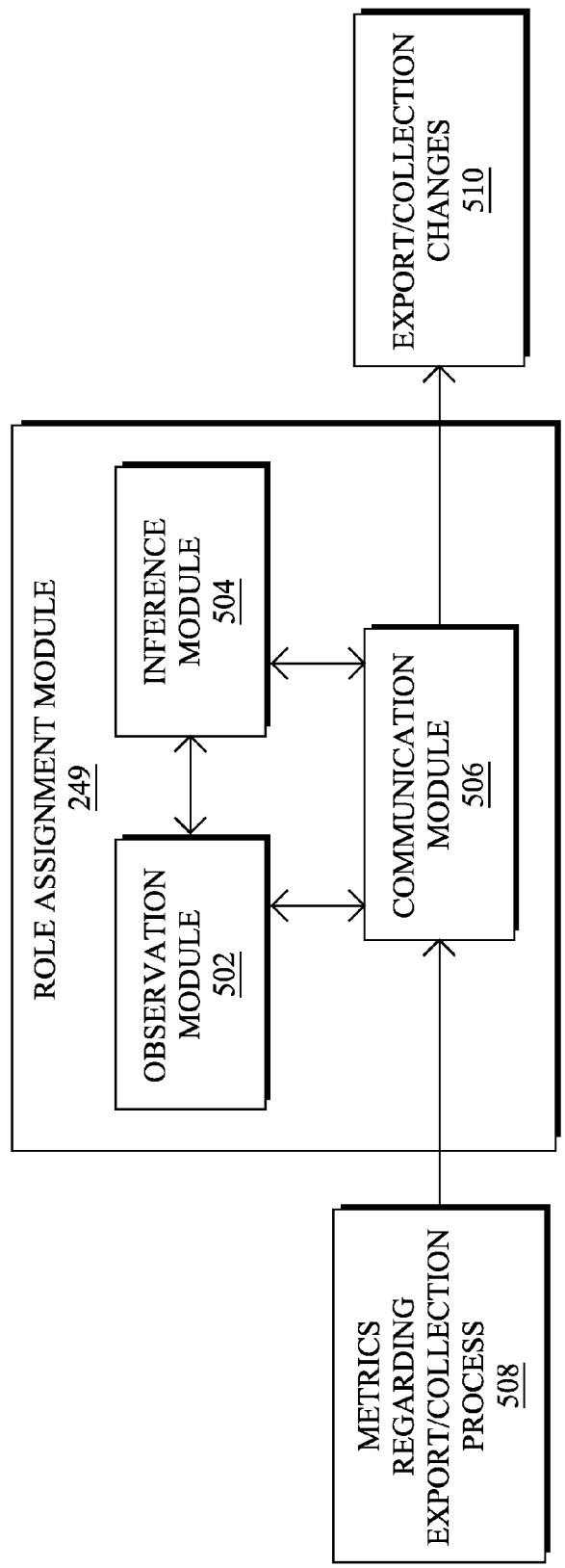
FIG. 5 illustrates an example architecture for dynamically adjusting exporter/collector role assignments.

Referring now to FIG. 5, an example architecture is shown for dynamically adjusting exporter/collector role assignments, according to various embodiments. At the core of the architecture shown is role assignment module 249 which, as described above, may be responsible for dynamically adjusting the roles of exporters and collectors to different elements in the network. As shown, role assignment module 249 may include an observation module 502, an inference module 504, and/or a communication module 506, to perform the functions described herein. In particular, role assignment module 249 may be operable to dynamically reassign collectors and exporters in the network based on the current state of the network. For example, role assignment module 249 may reassign collectors and exports to reduce stress in some parts of the network by moving these assignments to other parts of the network that have the capacity to support the collections. As will be appreciated, the functions described with respect to modules 502-506 may be integrated into one another or combined with other modules that perform other functions.

In various embodiments, observation module 502 may be configured to receive metrics 508 regarding the export/collection process. In some cases, observation module 502 may periodically sample performance metrics 508 regarding the devices (e.g., routers) and network parameters that are affected by the export/collection process used to collect information regarding the state of the network.

In some cases, performance metrics 508 retrieved by observation module 502 may include data regarding the operational state of the network devices involved in the export/collection process. For example, performance metrics 508 may include data regarding the CPU loads of one or more network devices. Such information may be a limiting factor in IoT applications and other constrained networks that include routers with limited processing resources. Performance metrics 508 may also include line-card load information for the various devices. Such information may be used, for example, in implementation in which the metrics exported by a given router were generated from the line card of the router.

Further information that may be included in performance metrics 508 may be traffic-related data regarding the export/collection process itself, such as queue lengths, transmission rates, bandwidth information, the path lengths traversed by the exported data, or any other information that may be used to evaluate how the export/collection process affects the operation of the network.

In various embodiments, observation module 502 may provide the metrics 508 regarding the export/collection process to inference module 504. As noted previously, modules 502 and 504 may be co-located on the same router itself, located on a network controller that has a centralized view of the complete network, or may even be distributed across different devices. Metrics 508 regarding the export/collection process used in the network may be provided by observation module 502 to inference module 504 on a push basis (e.g., periodically, etc.) or on a pull basis (e.g., in response to receiving a request for the data from inference module 504.

In general, inference module 504 may be configured to infer the effects of the export/collection process on the network. For example, inference module 504 may use the data regarding the export/collection process and/or information regarding the topology of the network, to determine whether any of the links or intermediate transit networks used in the export/collection process are being overused by the collections. In another example, inference module 504 may determine whether any adverse effects are present or about to be present on any service or application that is traversing the network at the same time that data is collected via the export/collection process (e.g., during a large scale collection of data by the export/collection process). In yet another example, inference module 504 may determine whether any redundant collections are taking place via the export/collection process that are unnecessary or are unrelated to the services provided in the network.

In some cases, role assignment module 249 may also include a communication module 506 that is responsible for providing the communication infrastructure to support observation module 502 and inference module 504. Communication module 506 may perform multiple tasks, such as establishing a communication channel between observation module 502 and inference module 504, and translating dynamic configuration change requests from the inference module 504 to the underlying network infrastructure. For example, communication module 504 may use Thrift calls, to facilitate communication between modules 502-504 and the various network devices.

Inference module 504 may take any number of actions to adjust the set of exporters and collectors in the network, based on how the export/collection process is affecting the network. In some cases, inference module 504 may instruct an exporter node to stop exporting metrics either permanently or temporarily (e.g., for a set time period, until the network is less congested, etc.). Inference module 504 may also instruct a collector node that the node will stop receiving exported metrics. Conversely, inference module 504 may instruct another device in the network (e.g., a router, server, etc.) that the device now needs to act as a collector and that the device will start receiving metrics from the exporters. Similarly, inference module 504 may instruct a network device to begin acting as an exporter.

Inference module 504 may also control how a given exporter operates, based on how the export/collection process affects the operation of the network. In one example, inference module 504 may notify one or more nodes that the nodes are to reduce their record generation period, to lower throughput and reduce utilization of intermediate links. Such a reduction may be associated with a given time period (e.g., for the next n-number of minutes) or during a certain time of day in which network resources are more taxed by user traffic. In another example, inference module 504 may instruct an exporter node to stop capturing certain data, to make each record smaller thus reducing throughput and utilization. In yet another example, inference module 504 may instruct an exporter node to use a different mechanism to capture and export metrics. For example, inference module 504 may select a mechanism from among the Data Path Service Set (DPSS)®, of Cisco Systems, Inc., Cisco IOS Flexible Netflow® of Cisco Systems, Inc., Next-Generation Network-Based Application Recognition (NBAR2)® of Cisco Systems, Inc., to name a few such services that may be used to capture and export metrics regarding the operational state of the network. Each mechanism has its own capability and cost in terms of overhead and, based on the state of the network, may be dynamically adjusted by inference module 504. In a further case, inference module 504 may instruct an exporter node to become a local collector. In such a case, the node may aggregate the captured metrics locally instead of sending the metrics to a remote collector. Doing so may reduce bandwidth utilization by the export/collection process and utilization of other network links.

Figure 6A:
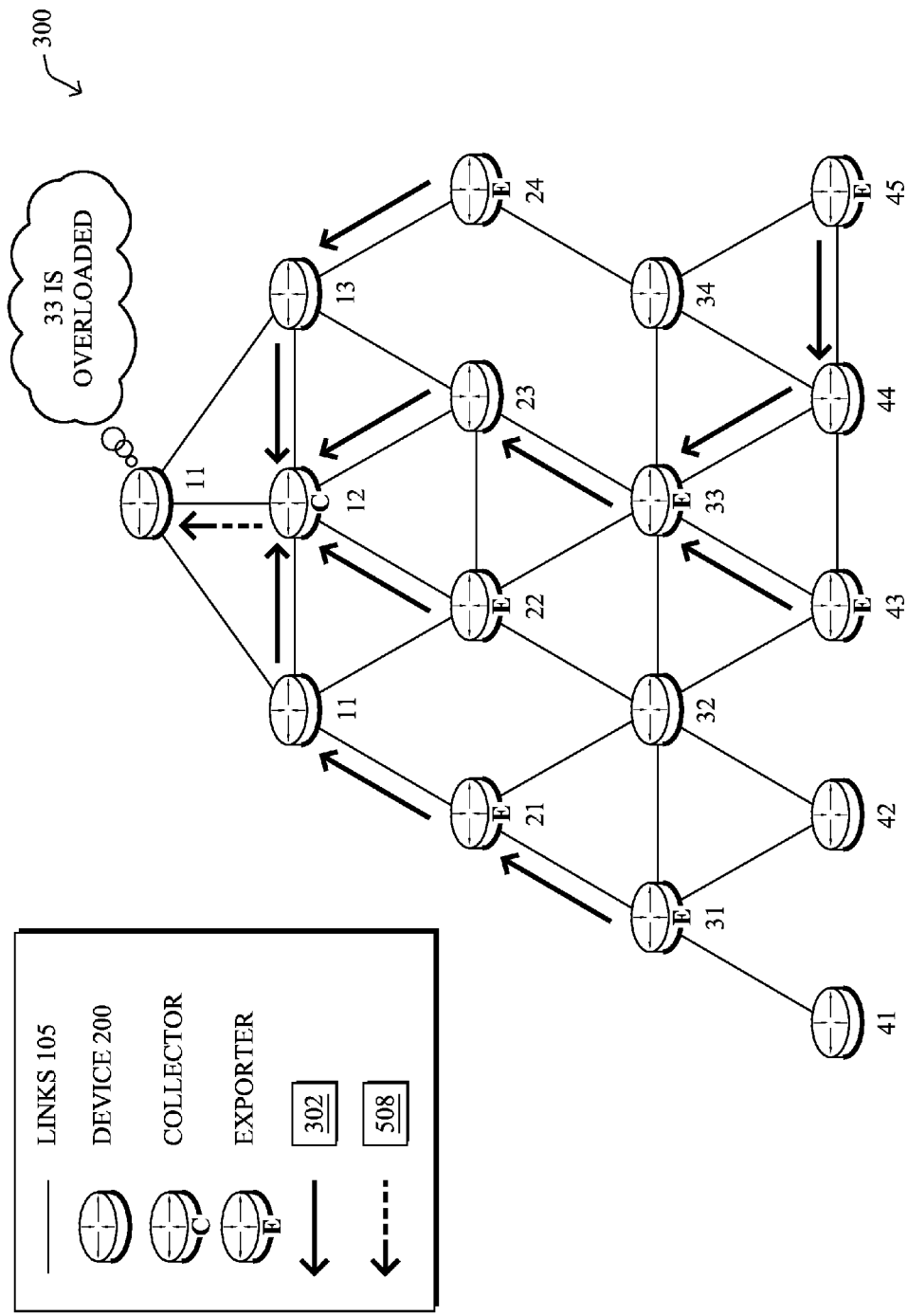
FIGS. 6A-6B illustrate an example of the adjustment of exporter/collector roles.
Figure 6B:
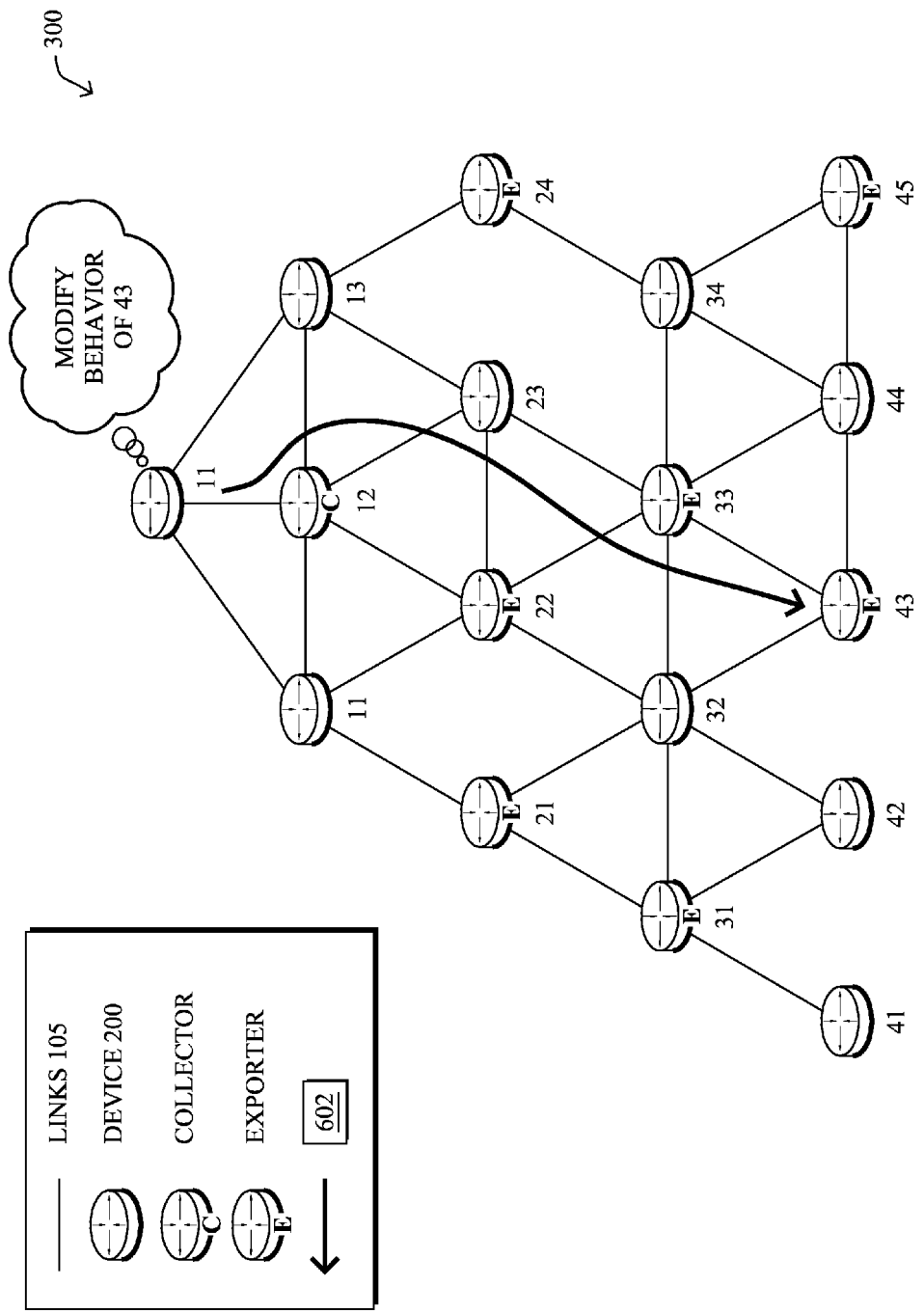

An example is shown in FIGS. 6A-6B of the adjustment of exporter/collector roles by a role assignment module (e.g., role assignment module 249), according to some embodiments. Continuing the example of FIG. 3, assume that a supervisory node 11 receives data 508 regarding the export/collection process from one or more other nodes (e.g., collector node 12 and/or other nodes). Data 508 may be received by node 11 in response to node 11 specifically requesting data 508 from collector node 12 or from another node of interest. In other cases, data 508 may be provided to node 11 on a push basis without node 11 specifically requesting data 508 (e.g., on a periodic basis, in response to a network metric exceeding a threshold value, etc.). As shown in FIG. 6A, node 11 may determine that node 33 is overloaded due to the current export/collection process and that modifying the behavior of node 43 (e.g., by turning off node 43 as an exporter, instructing node 43 to aggregate metrics before exporting the metrics, etc.) may alleviate the overloading of node 33. In response, node 11 may send an instruction 602 to node 43 to modify the behavior of node 43 accordingly.

Figure 7:
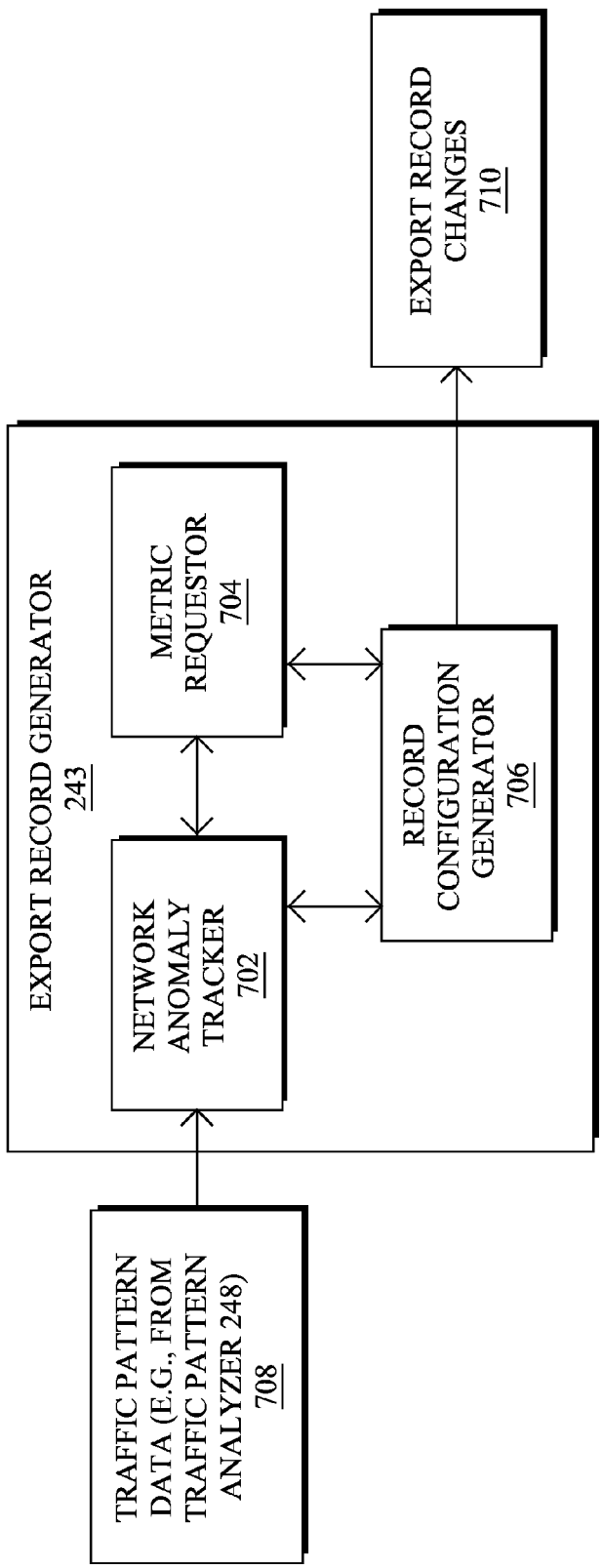
FIG. 7 illustrates an example architecture for dynamically adjusting exported network metrics.

Referring now to FIG. 7, an example architecture is shown for dynamically adjusting the export records of one or more exporter nodes, according to various embodiments. At the core of the architecture is export record generator 243, which may be responsible for dynamically configuring the metrics to be exported based on the state of the network. As shown, export record generator 243 may include a network anomaly tracker 702, a metric requestor 704, and/or a record configuration generator 706, as described in greater detail below. As will be appreciated, the functions described herein with respect to modules 702-706 may be integrated into one another, integrated into modules that perform other functions, or may even be distributed across different devices.

Network anomaly tracker 702 may be configured to detect the presence of an anomalous condition in the network based on traffic pattern data 708. In general, traffic pattern data 708 may include traffic-related information such as the current traffic trends and historical traffic profile. For example, network anomaly tracker 702 may receive traffic pattern data 708 from TPA 428 which, as described above, continuously tracks the various traffic profiles using learning machine 402. During operation, network anomaly tracker 702 may compare the current traffic trends with historical bounds to determine whether a network anomaly is present. The comparison may be based on criteria such as the average utilization of a path, the number of active applications utilizing the network, the rate of new flows arriving at a given device, the duration of a flow, TCP statistics, etc. If there are differences in these values, network anomaly tracker 702 may notify metric requestor 704 of the detected anomaly and provide details regarding where in the network the deviations are arising.

Metric requestor 704 may be configured to determine which metrics regarding the network should be monitored, in response to receiving an indication that an anomaly is present from network anomaly tracker 702. For example, if network anomaly tracker 702 reports that more TCP flows are present than expected, which could signify a stateful attack, metric requestor 704 may determine that one or more exporter nodes should also track the state of the TCP flows. For example, metric requestor 704 may determine that an exporter should also track the number of synchronization requests (SYNs), the number of synchronization-acknowledgement requests (SYN-ACKs), the number of final indicators (FINs), etc., observed by the exporter. In another example, if a larger than expected number of packet drops is determined by network anomaly tracker 702, metric requestor may determine that one or more exporters should also track the counters of each kind of application, to determine whether there is any unplanned activity being observed.

In one embodiment, metric requestor 704 may include a set of mappings that map a possible network behavior to the corresponding metric(s) that can help to narrow down the reason behind that particular behavior. In some implementations, metric requestor 704 may also control the timing and rate of the exported metrics. For example, in the case of a potential TCP based attack, metric requestor 704 may determine that reporting of the additional metrics by an exporter should start immediately and continuously until explicitly instructed to stop by export record generator 243.

Record configuration generator 706 may be configured to use the set of additional metrics determined by metric requestor 704 to generate export record changes 710. In other words, record configuration generator 706 may translate the new metric tracking requirements from metric requestor 704 to the corresponding platform-specific configurations of an exporter node, to generate export record changes 710. In some cases, record configuration generator 706 may maintain a list of all metrics that can possibly be tracked by a given node (e.g., to determine whether or not the node is capable of capturing the additional metrics). If a node is not capable of exporting a certain metric, record configuration generator 706 may exclude the metric from export record changes 710, generate an alert to metric requestor 704, or take other measures (e.g., alerting a network engineer). Once generated, export record changes 710 may instruct a given exporter (or collector) to begin tracking the requested metrics indicated by export record changes 710.

Figure 8A:
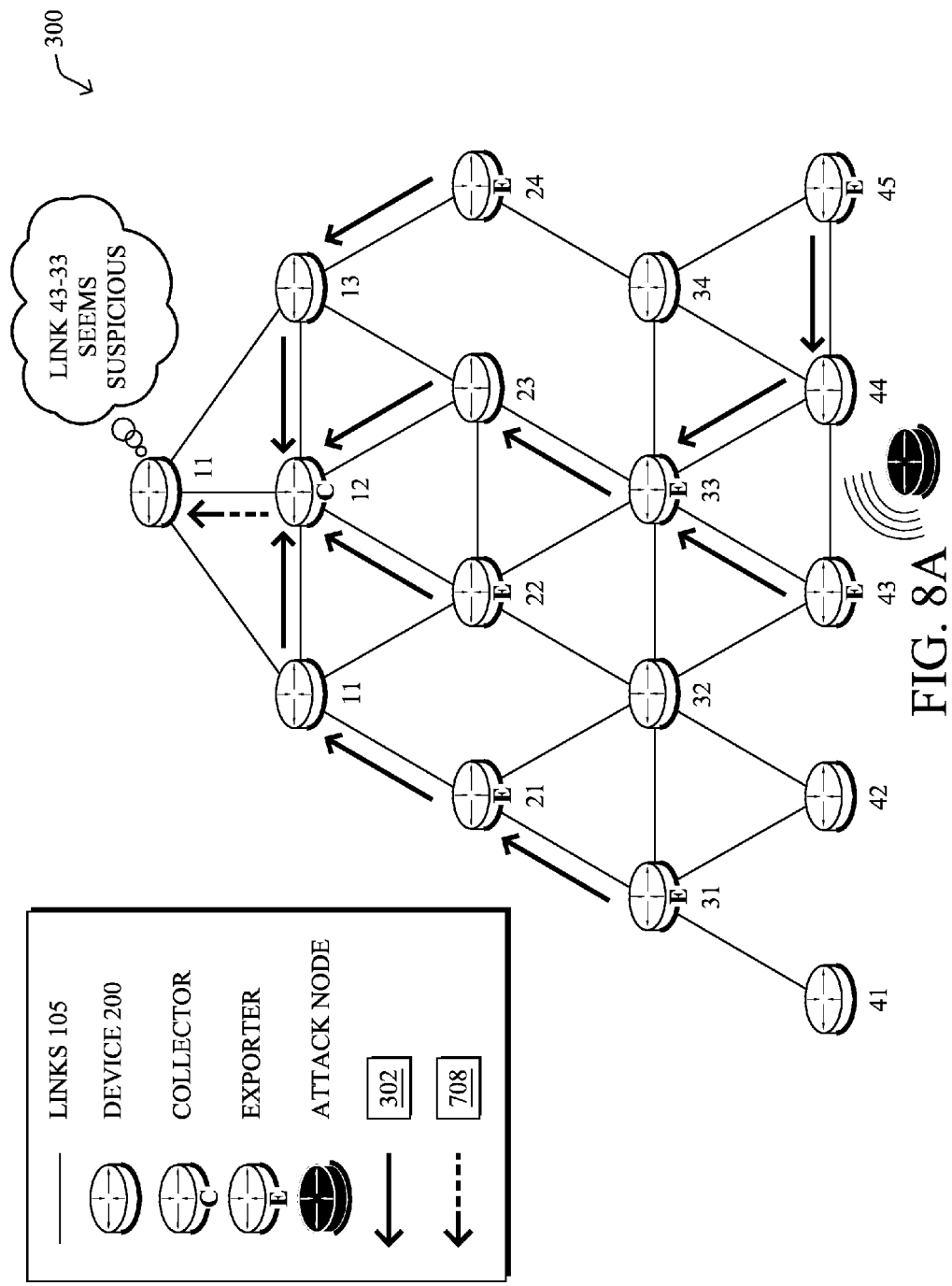
FIGS. 8A-8B illustrate an example of exported network metrics being adjusted.
Figure 8B:
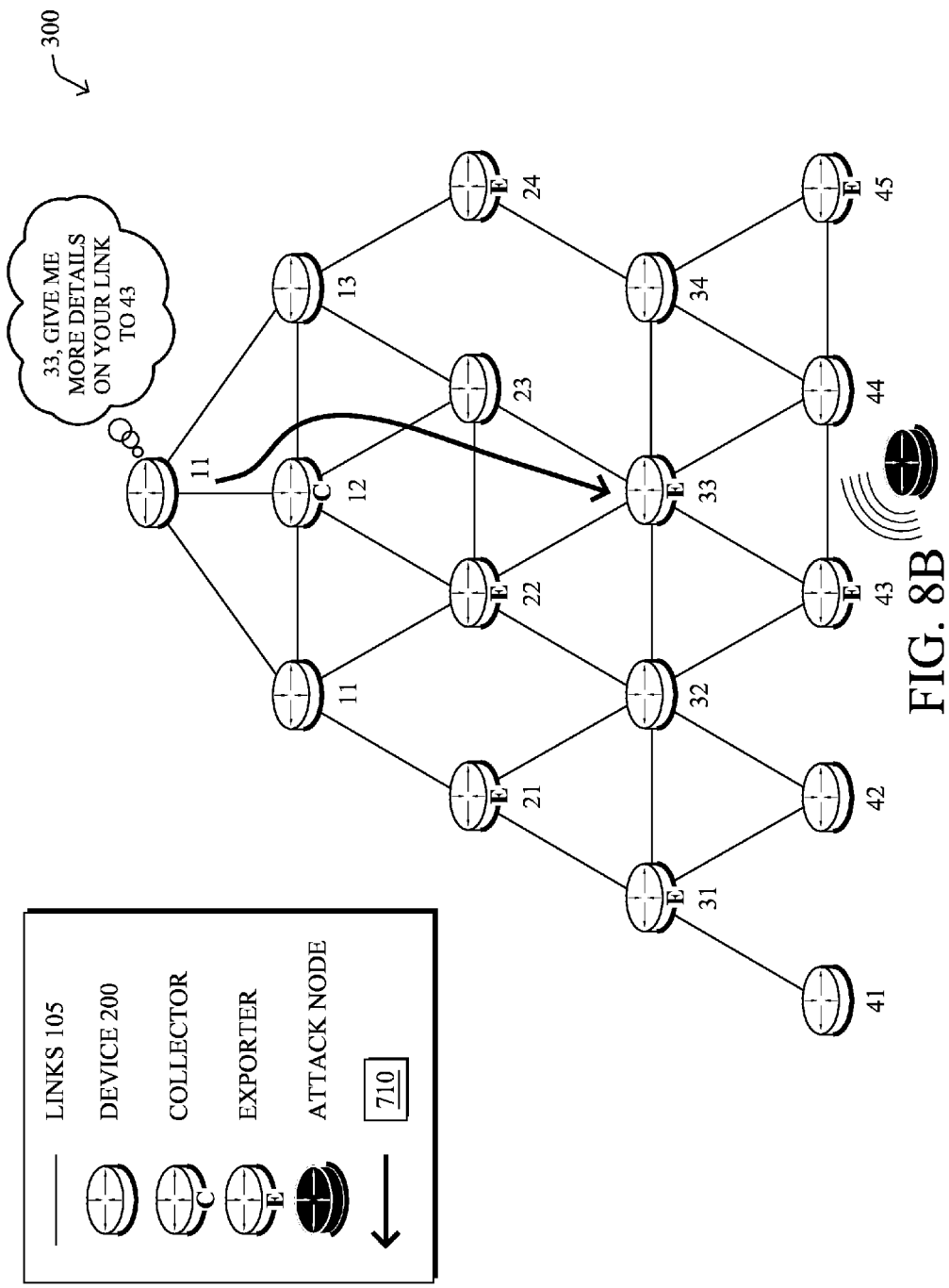

An example is shown in FIGS. 8A-8B of the network metrics exported by a node being adjusted dynamically, according to various embodiments. Assume for purposes of illustration that node 11 executes export record generator 243 and that traffic along link 43-33 is exhibiting a higher than expected amount of TCP traffic, as shown in FIG. 8A. This type of situation may indicate that an attack is being mounted by a malicious node against node 43, causing node 43 to send an excess amount of requests. In response, as shown in FIG. 8B, node 11 may send export record changes 710 to node 33 and/or to node 43, to begin capturing addition information regarding the TCP traffic (e.g., number of SYNs, SYN-ACKs, etc.) via the export/collection process. This additional information may be used, for example, to determine whether an attack is actually present.

Figure 9:
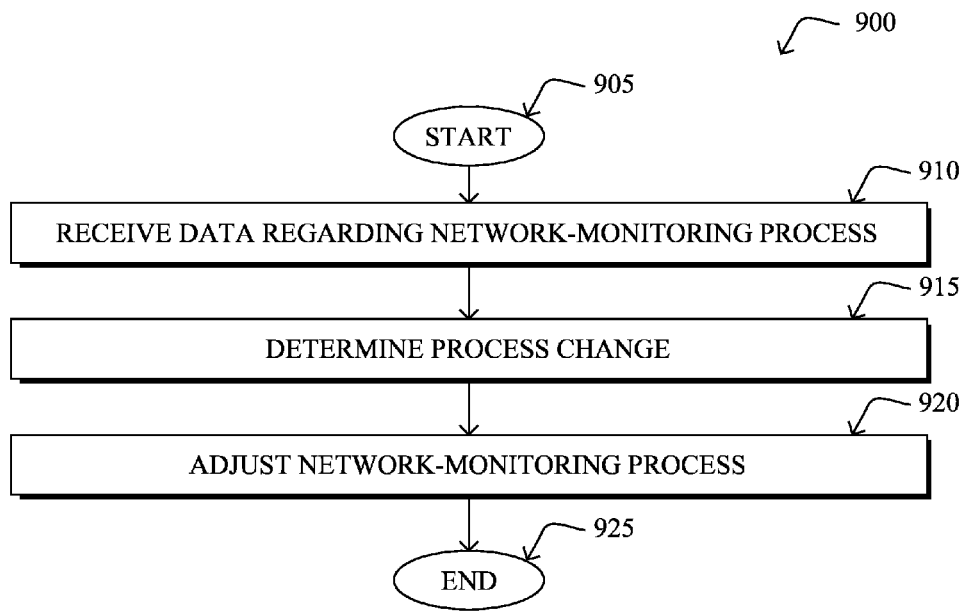
FIG. 9 illustrates an example simplified procedure for adjusting a network monitoring process.

FIG. 9 illustrates an example simplified procedure for adjusting a network monitoring process in accordance with one or more embodiments described herein. The procedure 900 may start at step 905, and continues to step 910, where, as described in greater detail above, data regarding the network-monitoring process is received. In various embodiments, the network-monitoring process may be an export/collection process in which one or more exporter nodes export certain metrics regarding the operational state of the network and one or more collector nodes aggregate the exported metrics. In some cases, the data regarding the network-monitoring process may be indicative of the effects of the export/collection on the operation of the network. For example, the received data may include, but is not limited to, resource utilization by a node (e.g., CPU usage, memory usage, etc.), queue lengths, bandwidth availability, etc. In further cases, the data regarding the network-monitoring process may include the collected metrics regarding the operation of the network as a whole (e.g., based on both user traffic and traffic attributable to the network-monitoring process).

At step 915, a change to the network-monitoring process is determined based on the received data regarding the process, as described in greater detail above. In some embodiments, the process change may be made in response to determining that an adverse effect is present in the network due to the network-monitoring process (e.g., a device is overloaded, user traffic is being impacted, etc.). In another embodiment, the process change may be made in response to determining that an anomalous condition is present in the network (e.g., a potential attack is underway, etc.). Changes to the network-monitoring process may include, for example, making changes to the set of nodes designated as exporters or collectors, adjusting which metrics are tracked and exported by the nodes, or the like.

At step 920, the network-monitoring process is adjusted to implement the change determined in step 915, as detailed above. Generally speaking, the network-monitoring process may be adjusted by sending instructions to one or more nodes, to alter the behavior of the nodes. In some embodiments, a node may be instructed to start or stop acting as an exporter or collector in the network-monitoring process. In further embodiments, the node may be instructed to stop exporting certain information or to begin exporting additional information. In yet additional embodiments, the node may be instructed to change how metrics are exported or be instructed to act as a local collector. Adjustment made to the network-monitoring process may be made on a temporary basis (e.g., during a certain time of day, for a certain length of time, etc.) or on a permanent basis, in various implementations. Procedure 900 then ends at step 925.

Figure 10:
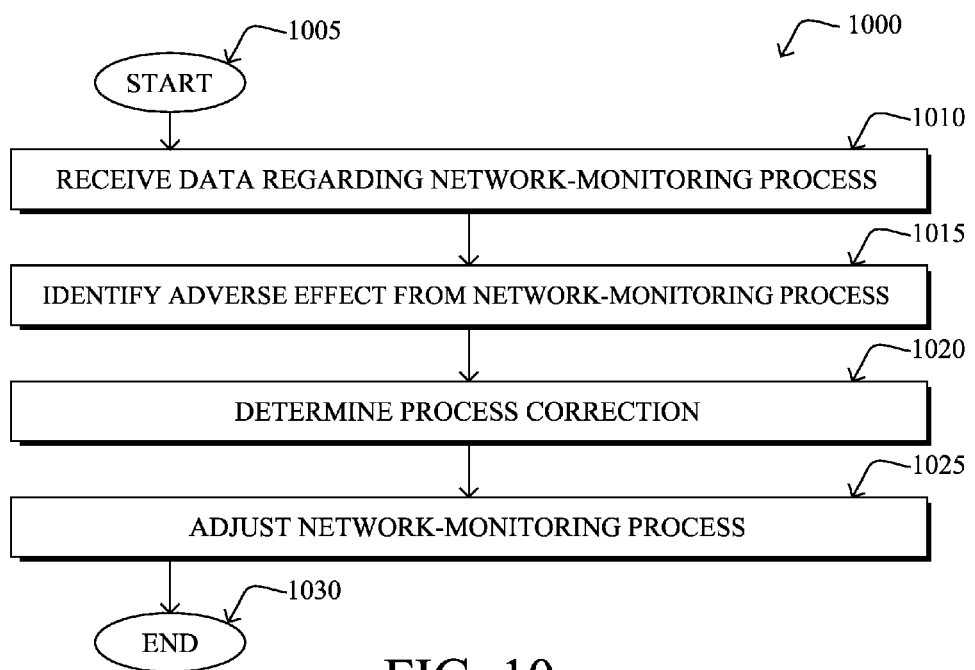
FIG. 10 illustrates an example simplified procedure for adjusting a network monitoring process based on a detected adverse effect of the monitoring.

FIG. 10 illustrates an example simplified procedure for adjusting a network-monitoring process based on a detected adverse effect, in accordance with one or more embodiments described herein. The procedure 1000 may start at step 1005, and continues to step 1010, where, as described in greater detail above, data regarding the network-monitoring process is received. As discussed above, the data may indicate any effects of the network-monitoring process on the operation of the network. For example, the received data may indicate how taxed the nodes involved in the network-monitoring process are in terms of resources, how the network monitoring process is affecting user traffic, etc.

At step 1015, an adverse effect from the network-monitoring process is identified, as described above. Adverse effects may include, but are not limited to, excess resource utilization of a node (e.g., excess CPU usage, etc.), a particular node or link being overloaded (e.g., excess queue lengths, decreased bandwidth availability, etc.), redundant collection of certain metrics, unnecessary collection of certain metrics, or the like.

At step 1020, a correction to the network-monitoring process is determined, as described above. In various cases, a correction may entail changing the exporter/collector roles of the nodes in the network, decreasing the amount of data that is exported (e.g., by not exporting certain metrics, by locally aggregating data before exporting the data, etc.), changing the tracking and exporting processes used by an exporter, or the like.

At step 1025, the network-monitoring process is adjusted, as detailed above, by instructing one or more nodes to implement the corrections determined in step 1020. For example, a particular exporter node may be instructed to stop exporting data as part of the network-monitoring process for a certain amount of time or indefinitely. Procedure 1000 then ends at step 1030.

Figure 11:
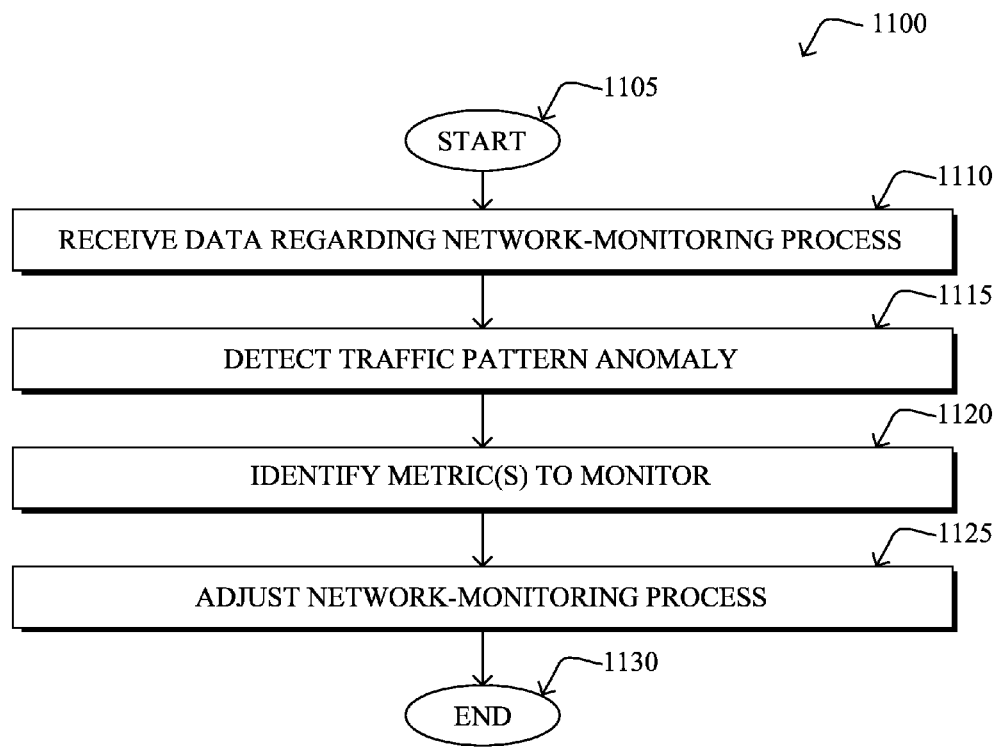
FIG. 11 illustrates an example simplified procedure for adjusting a network monitoring process based on a detected traffic pattern anomaly.

FIG. 11 illustrates an example simplified procedure for adjusting a network-monitoring process based on a detected traffic pattern anomaly, in accordance with one or more embodiments described herein. In contrast to procedure 1000 which is concerned with the effects of the network-monitoring process on the operations of the network, procedure 1100 may dynamically adjust the network-monitoring process to collect additional metrics concerning a detected traffic anomaly. The procedure 1100 may start at step 1105, and continues to step 1110, where, as described in greater detail above, data regarding the network-monitoring process is received. In various embodiments, the received data may include traffic information regarding the current traffic present in the network and traffic pattern data from a traffic pattern analyzer (e.g., TPA 248).

At step 1115, a traffic pattern anomaly is detected, as described in greater detail above. In various embodiments, the anomaly may be detected by comparing the current network traffic to modeled or predicted traffic patterns from a learning machine. For example, based on previous network traffic, traffic of a certain type may be predicted by such a model to be at a certain level. If the current and predicted/modeled traffic differ by a threshold amount, this may be considered an anomaly that requires further investigation. For example, such an anomaly may be attributable to a network attack, changing network conditions, etc. In various implementations, the location of the anomaly may also be associated with particular nodes or links within the network.

At step 1120, one or more metrics to monitor are identified, as detailed above. In general, the one or more metrics may provide greater detail regarding the anomalous condition. In some embodiments, anomaly types may be associated with different metrics and used to identify the appropriate metrics. For example, in the case of excess TCP traffic, additional metrics such as the number of SYNs, SYN-ACKs, etc. may be identified.

At step 1125, the network-monitoring process may be adjusted, as described in greater detail above. In various embodiments, an updated export record containing the one or more metrics indicated in step 1120 may be sent to one or more network nodes. Such an export record may cause a receiving node to track the indicated metric(s) and to export the metric(s) for further analysis, as part of the network-monitoring process. Procedure 1100 then ends at step 1130.

It should be noted that while certain steps within procedures 900-1100 may be optional as described above, the steps shown in FIGS. 9-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1100 are described separately, certain steps from each procedure may be incorporated into each other procedure, and the procedures are not meant to be mutually exclusive.

The techniques described herein, therefore, provide for dynamic adjusting a network-monitoring process. In some aspects, metric exporter and/or collector functionality can be dynamic and adjusted in the network based on the changing conditions of the network. In another aspect, collection and aggregation can start to take place locally before being exported (e.g., to a learning machine). This may reduce network utilization, which is of the utmost importance for constrained environments such as the IoT. In yet another aspect, exporting characteristics may be changed dynamically, to reduce the bandwidth being utilized be metric reporting. The metrics of interest also do not need to be determined apriori and may dynamically generated based on observed network events (e.g., the presence of a traffic pattern anomaly), according to the techniques herein. Further, reporting overhead may be reduced, as metric reporting can be dynamically controlled by reduce reporting parameters and reported fields. This may lead to efficient utilization of the network links and reduced processing at the routers.

While there have been shown and described illustrative embodiments that provide for predictive network control to be used in multicarrier WANs, it is to be understood that various other adaptations and modifications may be made within the spirit and scope of the embodiments herein. For example, the predictive networking techniques described herein may be adapted for use in other forms of networks, such as the IoT. In addition, the embodiments have been shown and described herein with relation to specific protocols and naming conventions for purposes of illustration. However, the embodiments in their broader sense are not as limited, and may, in fact, be used with other types of suitable protocols and/or naming conventions.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device, data regarding a network-monitoring process in which one or more nodes in a network monitor traffic flows flowing through the one or more nodes and export traffic records to one or more collector nodes that include network metrics for the monitored traffic flows;
   determining that the gathering of the network metrics and exporting of the traffic records by the network-monitoring process has an adverse effect on the network based on the received data, wherein the adverse effect comprises user traffic in the network being impacted by the network-monitoring process;
   determining a change to the network-monitoring process based on the received data and on the adverse effect;
   dynamically adjusting, by the device, the network-monitoring process to implement the determined change;
   detecting a traffic pattern anomaly in the network;
   identifying one or more metrics regarding the anomaly to monitor; and
   instructing a particular node to export the one or more metrics via traffic records.

2. The method as in claim 1, wherein adjusting the network-monitoring process further comprises:
   instructing a particular node to stop exporting traffic records.

3. The method as in claim 1, wherein adjusting the network-monitoring process further comprises:
   instructing a particular node to export fewer traffic records.

4. The method as in claim 1, wherein adjusting the network-monitoring process further comprises:
   instructing a particular node to export traffic records less frequently.

5. The method as in claim 1, wherein adjusting the network-monitoring process further comprises:
   instructing a particular node to aggregate metrics prior to exporting the aggregated metrics via exported traffic records.

6. The method as in claim 1, wherein adjusting the network-monitoring process further comprises:
   instructing a particular node to stop collecting network metrics.

7. The method as in claim 1, wherein the adverse effect corresponds to at least one of: increased traffic along a particular network link, redundant collection of network metrics from two or more nodes, or a decrease in performance for a particular application.

8. The method as in claim 1, wherein the traffic pattern anomaly corresponds to a change in at least one of: an average utilization of a path, a number of active applications, a rate of new traffic flows, or a duration of a traffic flow.

9. The method as in claim 1, wherein the one or more metrics regarding the anomaly are identified based on a mapping between network anomalies and metrics to monitor.

10. An apparatus, comprising:
    one or more network interfaces to communicate with a network;
    a processor coupled to the network interfaces and adapted to execute one or more processes; and
    a memory configured to store a process executable by the processor, the process when executed operable to:
       receive data regarding a network-monitoring process in which one or more nodes in the network monitor traffic flows flowing through the one or more nodes and export traffic records to one or more collector nodes that include network metrics for the monitored traffic flows;
       determine that the gathering of the network metrics and exporting of the traffic records by the network-monitoring process has an adverse effect on the network based on the received data, wherein the adverse effect comprises user traffic in the network being impacted by the network-monitoring process;
       determine a change to the network-monitoring process based on the received data and on the adverse effect;
       dynamically adjust the network-monitoring process to implement the determined change;
       detect a traffic pattern anomaly in the network;
       identify one or more metrics regarding the anomaly to monitor; and
       instruct a particular node to export the one or more metrics.

11. The apparatus as in claim 10, wherein the process when executed is further operable to:
    instruct a particular node to stop exporting traffic records.

12. The apparatus as in claim 10, wherein the process when executed is further operable to:
    instruct a particular node to export fewer traffic records.

13. The apparatus as in claim 10, wherein the process when executed is further operable to:
    instruct a particular node to export traffic records less frequently.

14. The apparatus as in claim 10, wherein the process when executed is further operable to:
    instruct a particular node to aggregate metrics prior to exporting the aggregated metrics via exported traffic records.

15. The apparatus as in claim 10, wherein the process when executed is further operable to:
    instruct a particular node to stop collecting network metrics.

16. The apparatus as in claim 10, wherein the adverse effect corresponds to at least one of: increased traffic along a particular network link, redundant collection of network metrics from two or more nodes, or a decrease in performance for a particular application.

17. The apparatus as in claim 10, wherein the traffic pattern anomaly corresponds to a change in at least one of: an average utilization of a path, a number of active applications, a rate of new traffic flows, or a duration of a traffic flow.

18. The apparatus as in claim 10, wherein the one or more metrics regarding the anomaly are identified based on a mapping between network anomalies and metrics to monitor.

19. A tangible, non-transitory, computer-readable media having software encoded thereon, the software when executed by a processor operable to:
    receive data regarding a network-monitoring process in which one or more nodes in the network monitor traffic flows flowing through the one or more nodes and export traffic records to one or more collector nodes that include network metrics for the monitored traffic flows;

determine that the gathering of the network metrics and exporting of the traffic records by the network-monitoring process has an adverse effect on the network based on the received data, wherein the adverse effect comprises user traffic in the network being impacted by the network-monitoring process;

determine a change to the network-monitoring process based on the received data and on the adverse effect;

dynamically adjust the network-monitoring process to implement the determined change;

detect a traffic pattern anomaly in the network;

identify one or more metrics regarding the anomaly to monitor; and instruct a particular node to export the one or more metrics.

* * * * *